United States Patent [19]

Brewer

[11] Patent Number: 4,848,318
[45] Date of Patent: Jul. 18, 1989

[54] HIGH EFFICIENCY FRYING APPARATUS WITH SUPERCHARGED BURNER SYSTEM

[75] Inventor: Edward L. Brewer, Shreveport, La.

[73] Assignee: The Frymaster Corporation, Shreveport, La.

[21] Appl. No.: 856,419

[22] Filed: Apr. 25, 1986

Related U.S. Application Data

[63] Continuation of Ser. No. 494,163, May 13, 1983, abandoned.

[51] Int. Cl.⁴ .................. A47J 27/00; A47J 37/00
[52] U.S. Cl. .................. 126/390; 126/343.5 R; 126/92 AC; 126/373; 99/403; 431/326; 431/328
[58] Field of Search .................. 126/391, 373, 343.5 R, 126/343.5 A, 387, 92 AC, 366, 360 R, 376, 390, 276; 122/50, 140 A, 116; 431/326, 328; 99/408, 403

[56] References Cited

U.S. PATENT DOCUMENTS

| | | |
|---|---|---|
| 2,176,869 | 11/1936 | Childs .................. 53/7 |
| 2,251,111 | 7/1941 | Brown .................. 126/391 |
| 2,429,360 | 11/1949 | Kells .................. 126/391 |
| 2,569,112 | 9/1951 | Miller et al. .................. 126/376 X |
| 2,655,144 | 4/1953 | Keating .................. 126/391 |
| 2,912,975 | 11/1959 | Del Francia .................. 126/391 |
| 3,024,836 | 3/1962 | Bello .................. 431/328 |
| 3,060,922 | 9/1962 | Wilson .................. 126/391 |
| 3,307,528 | 3/1967 | Cook .................. 126/33 |
| 3,421,496 | 1/1969 | Gething .................. 126/360 R |
| 3,695,818 | 10/1972 | Mizutani .................. 431/328 |
| 3,736,095 | 5/1973 | Leatherby .................. 451/328 |
| 3,809,062 | 5/1974 | Moore et al. .................. 126/373 |
| 3,960,137 | 6/1976 | Schmid .................. 126/38 X |
| 4,125,154 | 11/1978 | Franke et al. .................. 126/343.5 A |
| 4,397,299 | 8/1983 | Taylor et al. .................. 126/391 |
| 4,550,711 | 11/1985 | Grifhths .................. 126/391 |

FOREIGN PATENT DOCUMENTS

| | | | |
|---|---|---|---|
| 1056600 | 3/1954 | France .................. | 126/347 |
| 244538 | 10/1969 | U.S.S.R. .................. | 431/328 |
| 389182 | 3/1933 | United Kingdom .................. | 126/391 X R |

Primary Examiner—Albert J. Makay
Assistant Examiner—Carl D. Price
Attorney, Agent, or Firm—Hubbard, Thurman, Turner & Tucker

[57] ABSTRACT

A cooking apparatus having a frypot or assembly for heating a quantity of cooking oil including well center section arranged to have enclosed burner assemblies disposed on each side of the center section and forming combustion chambers for the combustion of a fuel-air mixture introduced into combustion chambers under a forced air flow system. The combustion chambers are charged with a forced flow of a fuel-air mixture under positive pressure by a blower assembly mounted on a manifold on the front of the frypot assembly. The manifold includes respective air flow control valve gates which may be selectively adjusted to balance the charging air flow to the respective burner assemblies. The frypot has opposed sidewalls and a rear wall which form parts of respective flow passages for combustion gases leaving the combustion chambers. The frypot sidewalls and rear endwall are provided with an array of flow guiding and heat exchange vanes or fins which channel at least some of the combustion gases in a multiple pass over the exterior surfaces of the frypot. The burner assemblies each include a pan shaped housing in which is disposed distributor plate for distributing a flow of a fuel-air mixture to a foraminous ceramic burner plate. Single dual cooking oil chamber frypots are provided with the heat exchanger configuration.

17 Claims, 6 Drawing Sheets

HIGH EFFICIENCY FRYING APPARATUS WITH SUPERCHARGED BURNER SYSTEM

This is a continuation of application Ser. No. 494,163, filed May 13, 1983 now abandoned.

BACKGROUND OF THE INVENTION

1. Field of the Invention

The present invention pertains to a deep fat frying apparatus having a frypot assembly with improved heat transfer surfaces for absorbing heat from burner combustion gases and a forced air supercharged burner system for increasing the heat input to the frypot.

2. Background

In the art of frying apparatus comprising a vat or frypot in which a quantity of cooking oil is heated for so called deep fat frying, there are several problems which are of longstanding, particularly, with respect to apparatus used for commercial cooking operations. Deep fat frying apparatus used in restaurants, including so called fast food dispensers, must be capable of rapid warmup time, a uniform temperature of the cooking oil, and maintenance of the cooking oil at a desired temperature when relatively large loads of raw foodstuffs are placed in the frypot. The ever increasing cost of hydrocarbon fuels such as natural gas and liquified petroleum gases has also placed high emphasis on improving the thermal efficiency of commercial cooking apparatus which use relatively large amounts of these fuels.

Although various designs of cooking vats or so called frypots have been developed in an effort to improve the rate of heating the cooking oil and to improve the distribution of heat to maintain a uniform temperature of the oil, the emphasis on the fast preparation of fast food wherein relatively large quantities of frozen foodstuffs are cooked rapidly has caused several problems in the development of deep fat fryers. In this regard, it has been deemed desirable to provide for increasing the heating capacity of the burner systems for fryers so that relatively large quantities of foods may be cooked in a relatively short time period and with proper control of the oil temperature to provide palatable foods cooked by this type of apparatus.

Along with the requirements for increased heating capacity of deep fat frying apparatus, the rapidly escalating cost of heating fuel has also made it highly desirable to increase the thermal efficiency of extracting the heat from the combustion gases to reduce fuel usage as much as possible. In this regard, the present invention provides several improved features in deep fat frying apparatus of the type wherein a frypot or vat is heated by a gas flame or gaseous combustion system. The abovementioned desiderata in the art of deep fat frying apparatus have been realized with an apparatus having a supercharged or forced air combustion system and improved structure for heat transfer from the combustion gases to the cooking oil contained in the frypot.

SUMMARY OF THE INVENTION

The present invention provides a frying apparatus having an improved burner system including forced air charging for improving the flow of combustion air through the burner assemblies and through a unique arrangement of heat exchange passages of a frypot assembly.

In accordance with one aspect of the present invention there is provided a burner system for a frying apparatus wherein a substantially closed or sealed combustion air system is provided to permit supercharging the burner combustion chambers with a combustion air and fuel mixture to increase the heating rate and heat input to the cooking oil. In a preferred arrangement according to the present invention a frypot is configured to have opposed sidewalls which, together with improved burner assemblies, form closed combustion chambers which are charged with a fuel-air mixture at superatmospheric pressure by a blower and manifold assembly mounted on the frying apparatus. A single charging air blower feeds combustion air through a manifold to opposed burner assemblies, and the manifold is provided with air flow controlling and balancing valves which may be selectively positioned to proportion the air flow as required to balance the heat input to the respective combustion chambers.

In accordance with another aspect of the present invention there is provided a frying apparatus having a frypot assembly with improved heat exchanger means wherein the combustion gases are conducted through a relatively long and turbulent flow path between the combustion chamber and the exhaust flue or stack to maximize the heat transfer rate and the total heat transferred from the combustion gases to the cooking oil. Opposed heat exchanger passages are formed on the sidewalls and on the rear endwall of the frypot and include a unique array of combined flow directing vanes and heat transfer fins which maximize the heat extracted from the combustion gases to thereby improve the thermal efficiency of the frying apparatus.

In accordance with yet another aspect of the present invention there is provided a deep fat frying or cooking apparatus having high efficiency burner assemblies which are adapted to thoroughly mix the fuel and combustion air prior to the combustion process and to distribute the fuel-air mixture evenly over relatively large surface areas so as to provide a large flame front or flame surface directly adjacent to a sidewall of the frypot. The burner assemblies are also of a configuration which permit relatively easy disassembly for servicing and replacement, as required.

In accordance with yet another aspect of the present invention there is provided a fryer type cooking apparatus which is readily adapted to utilize a single chamber cooking vat or frypot as well as a dual chamber frypot which may be interchanged and may utilize a relatively large number of common parts. Moreover, the overall arrangement of the combustion air charging system, the burner assemblies, the heat exchanger surfaces and an exhaust plenum arrangement is conveniently adapted to a unit having a single cooking oil chamber or dual chambers.

The provision of a frying apparatus with improved heating rate and total heat input as well as high thermal efficiency will be further appreciated by those skilled in the art upon reading the detailed description which follows herein. The advantages and superior features of the invention described above as well as other aspects of the invention will also become apparent.

DETAILED DESCRIPTION OF THE PREFERRED EMBODIMENTS

Figure 1:
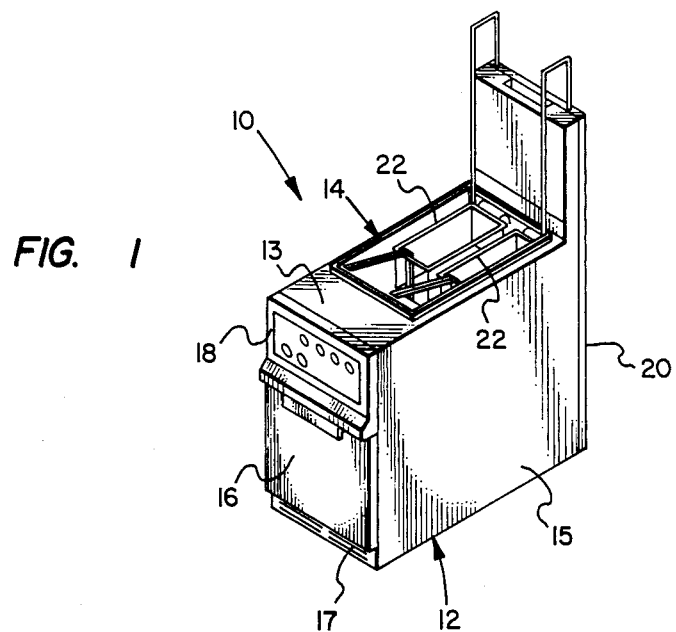
FIG. 1 is a perspective view of a deep fat fryer type cooking apparatus in accordance with the present invention.

In the description which follows like parts are marked throughout the specification and drawings with the same reference numerals, respectively. The drawings are not necessarily to scale and certain features of the invention may be shown exaggerated in scale or in somewhat schematic form in the interest of clarity and conciseness.

Referring to FIG. 1, there is illustrated a cooking apparatus of the type particularly adapted for so called deep fat frying. The apparatus illustrated is generally designated by the numeral 10 and is of a type used for commercial cooking purposes such as in fast food restaurants and other food service establishments. The apparatus 10 includes a generally rectangular uninsulated metal cabinet 12 forming an enclosure for a frypot assembly 14. The frypot assembly 14 is adapted to be removably inserted in the cabinet 12 and suitably supported by a top wall 13. The cabinet 12 also includes opposed sidewalls 15, one shown in FIG. 1, and a front panel 16 which is hinged for access to controls and other apparatus associated with the frypot assembly to be further described herein. The apparatus 10 also includes a suitable control panel 18 forming part of the front wall of the cabinet 12 and including suitable temperature and time controls for use in controlling the apparatus 10 in cooking various foodstuffs. The cabinet 12 also includes a backwall assembly 20 including suitable mechanism for raising and lowering one or more cooking baskets 22 shown disposed partially elevated out of the frypot assembly 14. A louvered air inlet grille 17 may be provided as part of the front panel 16.

Figure 2:
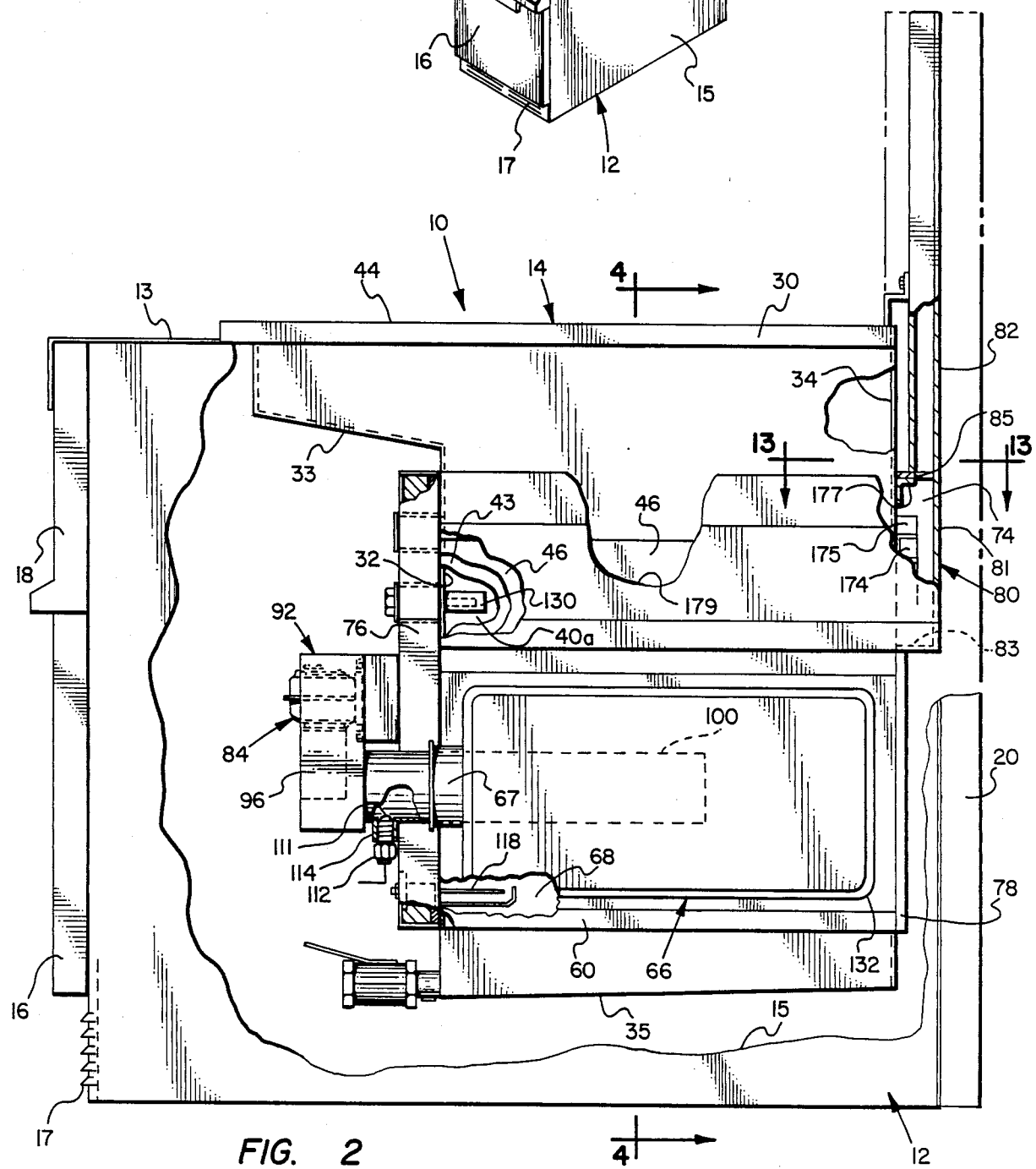
FIG. 2 is a side elevation of the fryer apparatus having portions of the outer cabinet and the frypot assembly broken away to show details of the frypot assembly.
Figures 4, 5:
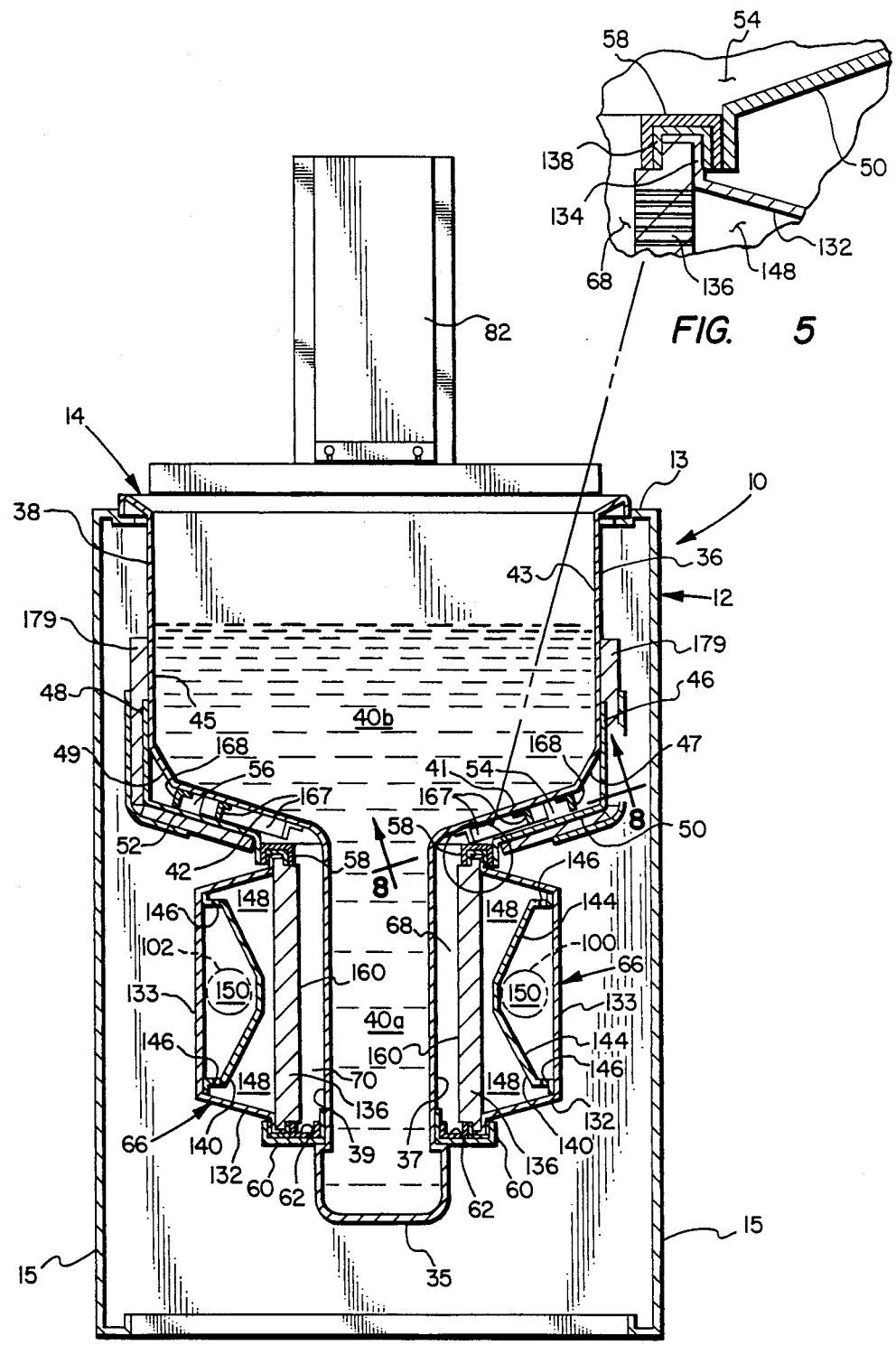
FIG. 4 is a section view taken generally along the line 4—4 of FIG. 2.
FIG. 5 is a detail section view on a larger scale of the area generally within the circle shown in FIG. 4.

Referring now to FIGS. 2 and 4, the frypot assembly 14 includes a unitary stainless sheet steel vat type frypot 30 including respective front and rear endwalls 32 and 34 and opposed sidewalls 36 and 38 forming an interior smooth walled chamber 40a, 40b. The sidewalls 36 and 38, FIG. 4, include lower vertical portions 37 and 39 forming, with a bottom wall portion 35, the relatively narrow deep well portion 40a of the frypot, the bottom of which forms a cold zone to minimize circulation of cooking debris. The sidewalls 36 and 38 flare outwardly and slope upwardly at portions 41 and 42 to join the vertical sidewall portions 37 and 39 with further spaced apart upper sidewall portions 43 and 45, as shown, to form the main interior cooking chamber portion 40b. The configuration of the central deepwell chamber portion 40b and the sloping upper sidewalls 41 and 42 provides a superior cooking chamber shape for circulation of the cooking oil and a desirable temperature gradient in the oil. The frypot 30 is also preferably provided with an upper annular rim 44 delimiting a top opening. The front wall 32 also includes a forwardly projecting portion 33, FIG. 2, forming a drainboard.

Referring further to FIG. 4, the frypot 30 also includes opposed outer sidewall portions 46 and 48 which are suitably secured to and extend downwardly from the respective opposed vertical sidewall portions 43 and 45 and include portions 50 and 52, respectively. The wall portions 50 and 52 are spaced from the sloping sidewall portions 41 and 42 to define chambers comprising heat exchange flow passages 54 and 56 for conducting combustion gases along the outside surfaces of the wall portions 41 and 42 in a preferred manner and including unique structure to be described further herein. The outer sidewalls 46 and 48 terminate at their lower ends at short vertically extending portions which are suitably welded to inverted channel members 58, see FIG. 5 also. The channel members 58 are spaced from and are opposed to respective channel assemblies 60–62 which are suitably welded to the lower sidewalls 37 and 39, as illustrated. The channel members 58, and 60–62 define opposed aligned slots for receiving and supporting respective burner assemblies 66. The burner assemblies 66 are spaced from the opposed sidewalls 37 and 39 to define combustion chambers 68 and 70, FIG. 4, which are in flow communication with the passages 54 and 56, respectively.

Figure 13:
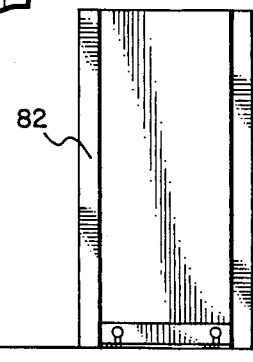
FIG. 13 is a detail section view taken along the line 13—13 of FIG. 2.
Figure 3:
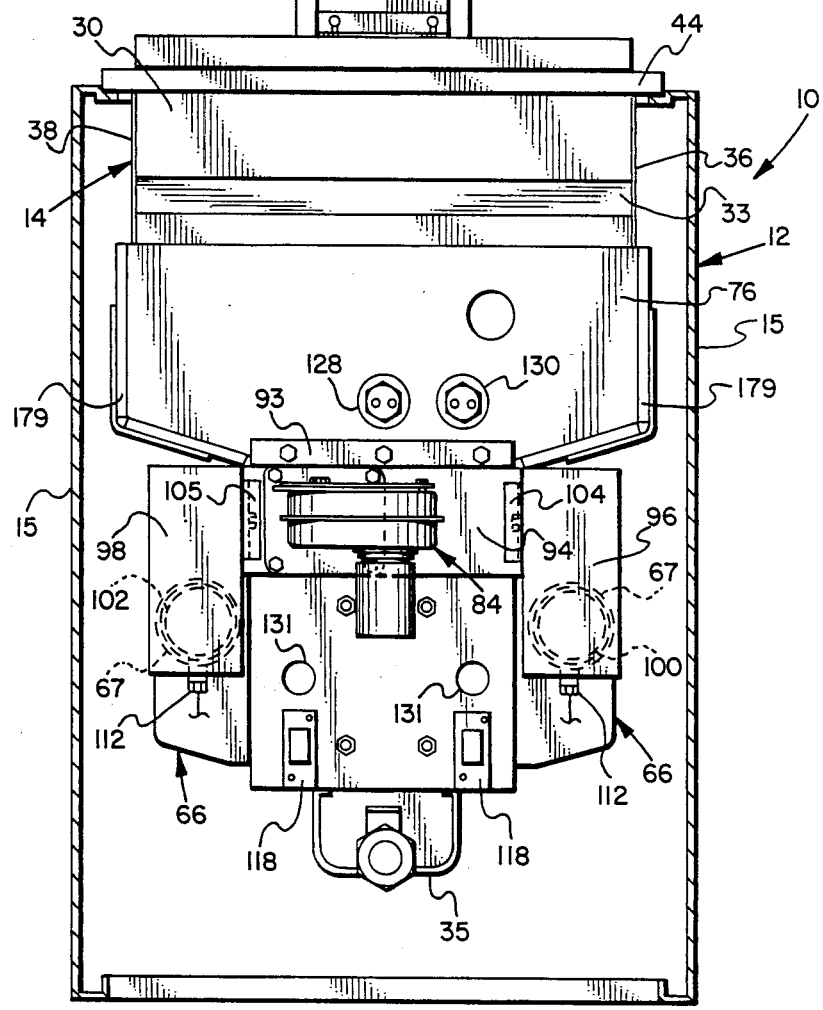
FIG. 3 is a front elevation of the frypot assembly.

Referring to FIGS. 2 and 3, the frypot assembly 14 also includes an insulated composite front wall panel 76 which is suitably secured to the front wall 32 and closes and insulates the forward end of the combustion chambers 68 and 70 as well as the passages 54 and 56. The frypot assembly 14 also includes a rear insulated wall panel 78, see FIGS. 2 and 9, suitably secured to the rear wall 34 and closing the rear end of the combustion chambers 68 and 70. As shown in FIGS. 2 and 13, the outer sidewall members 46 and 48 extend rearward of the rear wall 34 in supportive relationship to an exhaust gas plenum 80 which includes a vertically extending stack or flue pipe 82 projecting upwardly therefrom. The plenum 80 comprises a somewhat pan shaped housing having a backwall 81 and a perimeter sidewall 83 but is open toward the frypot rear wall 34. The sidewall 83 is dimensioned to slip between the walls 46 and 48 in close fitting relationship to the walls including the portions 50 and 52 and abut the rear wall 34 to form a chamber 74. Accordingly, combustion gases exit toward the rear of the frypot assembly 14 from the passages 54 and 56, are collected in the interior chamber 74 of the plenum 80 and then flow upwardly through an opening 85 in the perimeter wall 83 and through the stack 82. The stack 82 is adapted to communicate with a standard exhaust duct or flue, not shown, for conducting exhaust gases out of the room in which the fryer apparatus 10 is located.

Figure 6:
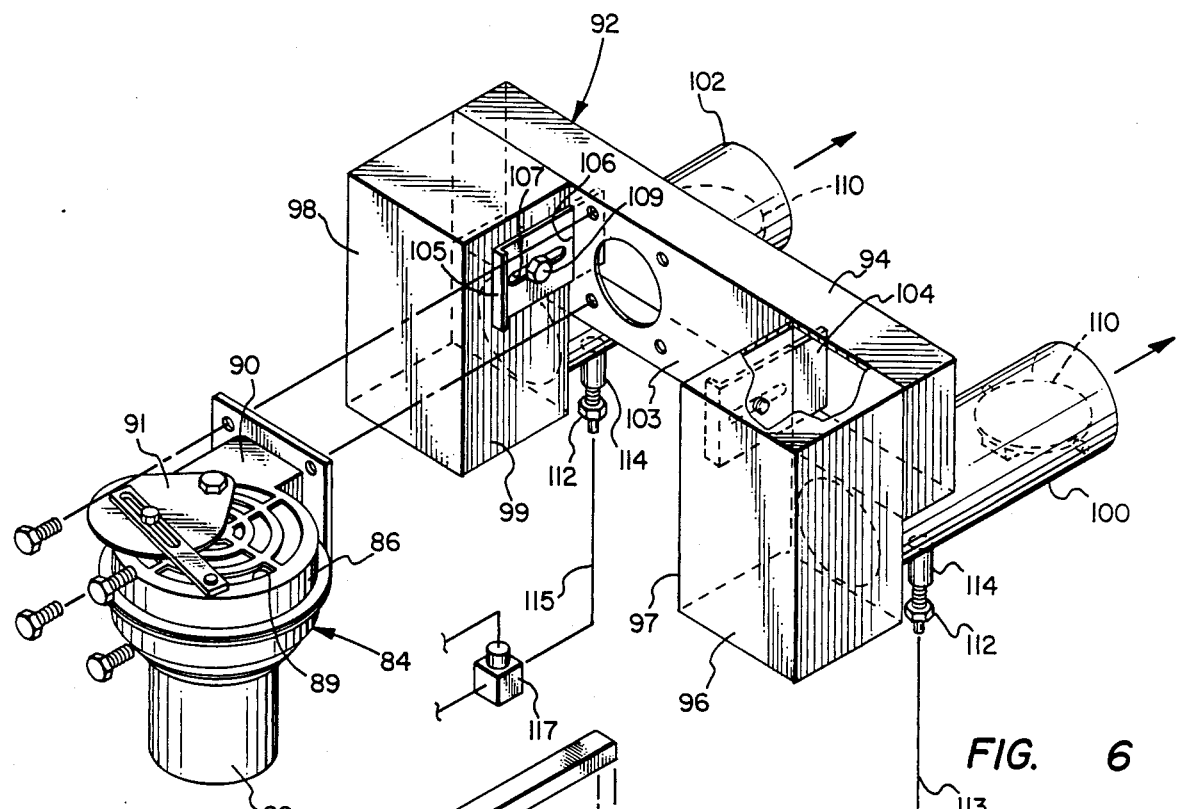
FIG. 6 is a detail exploded perspective view of the charging air blower and manifold.

Referring again to FIGS. 2 and 3, and also FIG. 6, combustion air for the respective burner assemblies 66 is conducted to the burner assemblies by way of a combustion air charging blower unit, generally designated by the numeral 84. The blower unit 84 includes an aerodynamic type air compressor or blower 86 coupled to a drive motor 88 and including in a housing having an inlet opening 89 and a discharge duct 90. The blower unit 84 may be of a suitable type commercially available. The blower unit 84 is mounted on conduit means including a combustion air supply manifold 92 which includes a transverse distribution duct 94 and branch ducts 96 and 98. The ducts 96 and 98 include cylindrical burner tube portions 100 and 102 which extend through collars 67 into the interior of the respective burner assemblies 66.

The air distribution duct 94 is of substantially rectangular cross-section including a front sidewall portion 103 adapted to support the blower unit 84 thereon. The branch ducts 96 and 98 are each provided with flow regulating or throttling valve means including valve gate members 104 and 105 which are characterized as platelike members having a mounting flange formed thereon, mounted on respective sidewalls 97 and 99 of the branch ducts 96 and 98 and projecting through respective slots 106, one shown in FIG. 6, formed in the wall 103. As shown by way of example in FIG. 6, the valve gate member 105 is supported on the duct wall 99 by a screw 109 which projects through a slot 107 in the gate member so that the gate member may be adjustably positioned to project into the interior flow passage of the distribution duct 94 just upstream of the intersection of the distribution duct with the branch duct 98. The valve gate member 104 is similarly located with respect to the duct 96. Accordingly, the gate members 104 and 105 may be adjustably positioned to project into the flow path of the charging air for the burner assemblies 66 to control the air flow to the respective burner assemblies to provide the requisite amount of combustion air. The manifold 92 includes a suitable flange 93, FIG. 3, for securing the combustion air charging system to the front side of the frypot assembly 14 in front of the panel 76.

As shown in FIG. 6, the blower unit 84 also includes an inlet throttling valve 91 which may be adjustably positioned to throttle inlet air flow to the blower impeller to also control the total charging air flow to the burner assemblies 66. The burner charging air system is also provided with butterfly type dampers 110, FIG. 6, interposed in the burner tubes 100 and 102 to prevent convection heat transfer away from the frypot due to flow of ambient air through the combustion air charging system when the blower and the burner assemblies are not operating. The dampers 110 may be lightly spring loaded or gravity responsive butterfly type valves which permit flow through the system only under sufficient pressure as provided by operation of the blower unit 84. The dampers 110 may be disposed elsewhere in the charging system such as by providing a single damper in the blower outlet duct 90.

Referring again to FIGS. 2 and 6, the respective burner assemblies 66 are adapted to receive a fuel-air mixture through the respective tubes 100 and 102. The tubes 100 and 102 are each provided with a fuel injection nozzle 112 comprising a suitable fitting threaded into a boss 114 projecting down from the bottom side of the respective tubes. The nozzles 112 are suitably connected to respective fuel supply conduits 113 and 115 for conducting gaseous fuels such as natural gas, butane or propane to be injected into the interior of the tubes 100 and 102 to mix with the charging air being introduced into the respective burner assemblies 66. Each of the injection nozzles 112 includes a tip portion 111, see FIG. 2 by way of example, projecting into the interior of the respective tubes 100 and 102. As shown also in FIG. 3, the frypot assembly 14 is provided with suitable fuel igniter assemblies 118 which are mounted on the rear portion of composite front wall panel 76 and project into the respective combustion chambers 68 and 70. The nozzles 112 are also adapted to receive fuel from a suitable source, not shown, by way of separate control valves 117, FIG. 6. The frypot assembly 14 is also provided with suitable temperature probe assemblies 128 and 130 which project into the cooking chamber 40a through the front wall 32 and are mounted in suitable bosses secured to the front wall. The frypot assembly 14 also includes transparent glass inspection ports 131 for viewing the combustion chambers 68 and 70.

Figure 7:
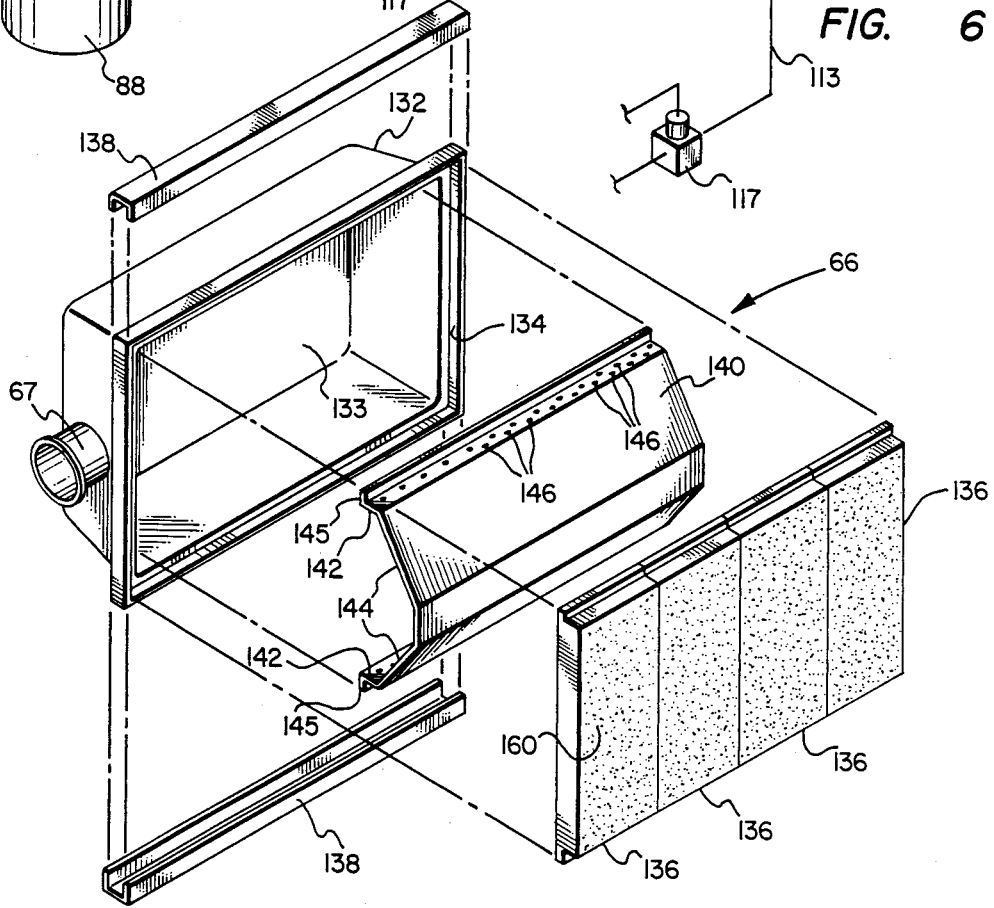
FIG. 7 is an exploded perspective view of one of the burner assemblies.

Referring now to FIG. 7, there is illustrated an exploded perspective view of one of the burner assemblies 66. The burner assemblies 66 are adapted to be used interchangeably on both sides of the frypot 30 by merely inverting the burner assembly when used on one side versus the other. The burner assemblies 66 each include a hollow somewhat pan shaped housing 132 having a perimeter flange 134 forming a mounting surface for a plurality of ceramic foraminous burner plates 136. The burner plates 136 are adapted to have a large number of relatively small diameter orifices extending therethrough and opening to a combustion surface 160 for supporting a distributed somewhat planar flame front within the respective combustion chambers 68 and 70. The burner plates 136 are suitably retained on the housing 132 by opposed channel type retainer members 138. The burner assembly 66 also includes a flow distribution plate, generally designated by the numeral 140, having opposed parallel side portions 142 which are contiguous with sloping sidewalls 144. The distribution plate 140 is adapted to be supported in the interior of the housing 132 against a backwall 133 and may be welded to the backwall along opposed flange portions 145.

Figure 10:
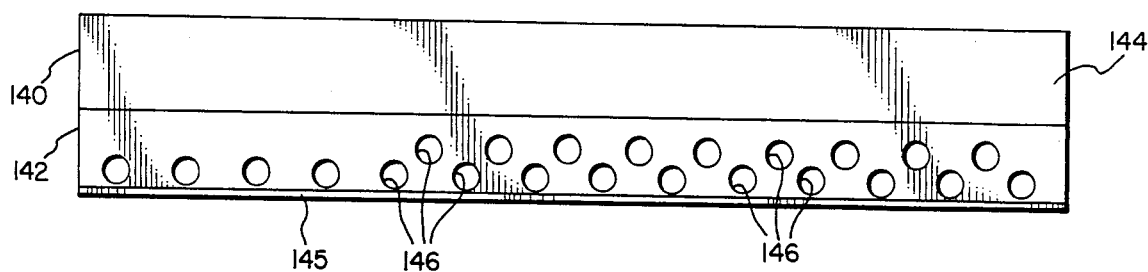
FIG. 10 is a side elevation of one of the burner distribution plates.

Referring also to FIG. 10, the burner distribution plate 140 is shown in side elevation wherein one of the sidewall portions 142 is shown with a pattern of flow distributing ports 146 disposed therein. The ports 146 are arranged to provide for substantially uniform distribution of the flow of a fuel-air mixture entering the interior of the housing 132 from the respective burner tubes 100 or 102. As shown in FIG. 2, by way of example, the burner tube 100 projects into the interior of the housing 132 from the collar 67 about sixty percent (60%) of the overall interior length of the housing. Accordingly, the array of distribution ports 146 on the sidewalls of the distribution plate are such that a fewer number of ports are disposed immediately adjacent to the outlet of the burner tube to prevent short circuiting of the flow through the burner assembly.

Referring also to FIG. 4, it will be appreciated that the configuration of the distribution plate 140 for each of the burner assemblies provides for opposed interior flow chambers 148, formed between the burner plates 136 and the distribution plates 140, which are of progressively decreasing cross-sectional area toward the central portion of the combustion surface 160 when viewed in cross-section as shown in FIG. 4. Thanks to the sloping sidewall portions 144 and the arrangement of the distribution ports 146, a fuel-air mixture entering the interior of the housing 132 into respective chambers 150 formed between the distribution plates 140 and the housing backwall 133 flows into the respective opposed chambers 148 through the opposed sets of distribution ports 146 and then through the foraminous burner plates 136 to the respective combustion chambers 68 and 70. The burner assemblies 66 provide for particularly thorough mixing of the fuel-air mixture entering the burner assemblies, even distribution of the fuel-air mixture to the respective combustion surfaces 160 and, accordingly, more efficient combustion of the fuel than prior art burner assemblies for frying apparatus of the type described herein.

Figure 8:
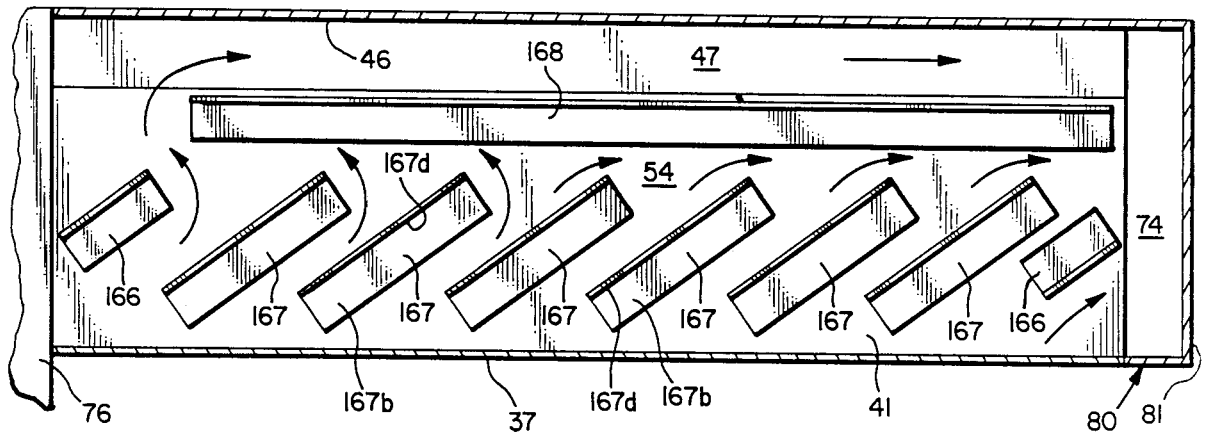
FIG. 8 is a detail section view taken along the line 8—8 of FIG. 4.

The frypot 14 also provides for more efficient heat transfer from the combustion gases generated in the combustion chambers 68 and 70 to the cooking oil contained within the interior of the frypot 30. In this regard, the heat transfer which takes place in the passages 54 and 56 and the chamber 74 formed between the plenum 80 and the rear wall of the frypot is also greater than with prior art frying apparatus of the general type described herein. Referring again to FIG. 4 and also FIG. 8, there is illustrated an arrangement of combined flow directing and turbulating vanes and heat transfer fins which are shown disposed on the upper sidewall portions 41 and 42. Referring to FIG. 8, in particular, the upper sidewall 41 is provided with a series of somewhat L shaped platelike fins or vanes 166, 167 and 168 which are adapted to direct the flow of combustion gases upward along the sidewall 41 and along sidewall portion 47. The vanes 166 and 167 are arranged substantially parallel to each other to provide respective flow channels therebetween and are disposed at an angle of approximately 50° with respect to the planes of the frypot front and rear walls 32 and 34.

The flow of combustion gases from the chamber 68, for example, enters the passage 54 after heating a primary heat transfer area defined by frypot side wall portion 37 (FIG. 4) and flows between the vanes 166 and 167 and impinges on the vane 168. The combustion gas flow traversing passage 54 flows along a secondary heat transfer area which includes the frypot side wall portions 41 and 47 (FIG. 4). The vane 168 redirects the gas flow generally horizontally toward the front and rear walls of the frypot wherein approximately half of the flow entering the passage 54 is turned towards the closure formed by the front wall 76 and then reverses direction after reaching the forward edge of the vane 168 and flows towards the plenum 80 through a section of passage 54 defined generally between the vane 168, the upper sidewall portion 47 and the outer sidewall 46. The combustion gas flow entering the channels formed between the vanes 167 and 166 toward the rear of the frypot 30 are deflected by the vane 168 and flow directly toward the plenum 80.

As shown in FIG. 8, each of the vanes 167 includes a base portion 167b and a flow detecting surface 167d. The configuration of the vanes 167 is typical of the vanes 166 and 168, also. The base portions of the vanes 166, 167 and 168 are suitably spot welded to the sidewall portion 41 at spaced apart intervals. The vanes 166, 167 and 168 may also be secured to the walls of the frypot by a suitable heat conducting adhesive to enhance the heat transfer capacity of the vanes. The base portions of the vanes 166, 167 and 168 are operably contiguous with the wall surfaces of the frypot sidewalls and provide relatively large contact area for the transfer of heat to the sidewalls of the frypot itself. The vane arrangement on the sidewall portions 42 and 49 substantially identical to the arrangement illustrated in FIG. 8 and comprises the mirror image of the arrangement illustrated. The vanes on the sidewall 42 are angled in the same direction, that is from the front of the frypot 30 towards the rear, at the same inclination as for the vane arrangement on the sidewall 41 and with the same configuration of vanes 166, 167 and 168.

Figure 9:
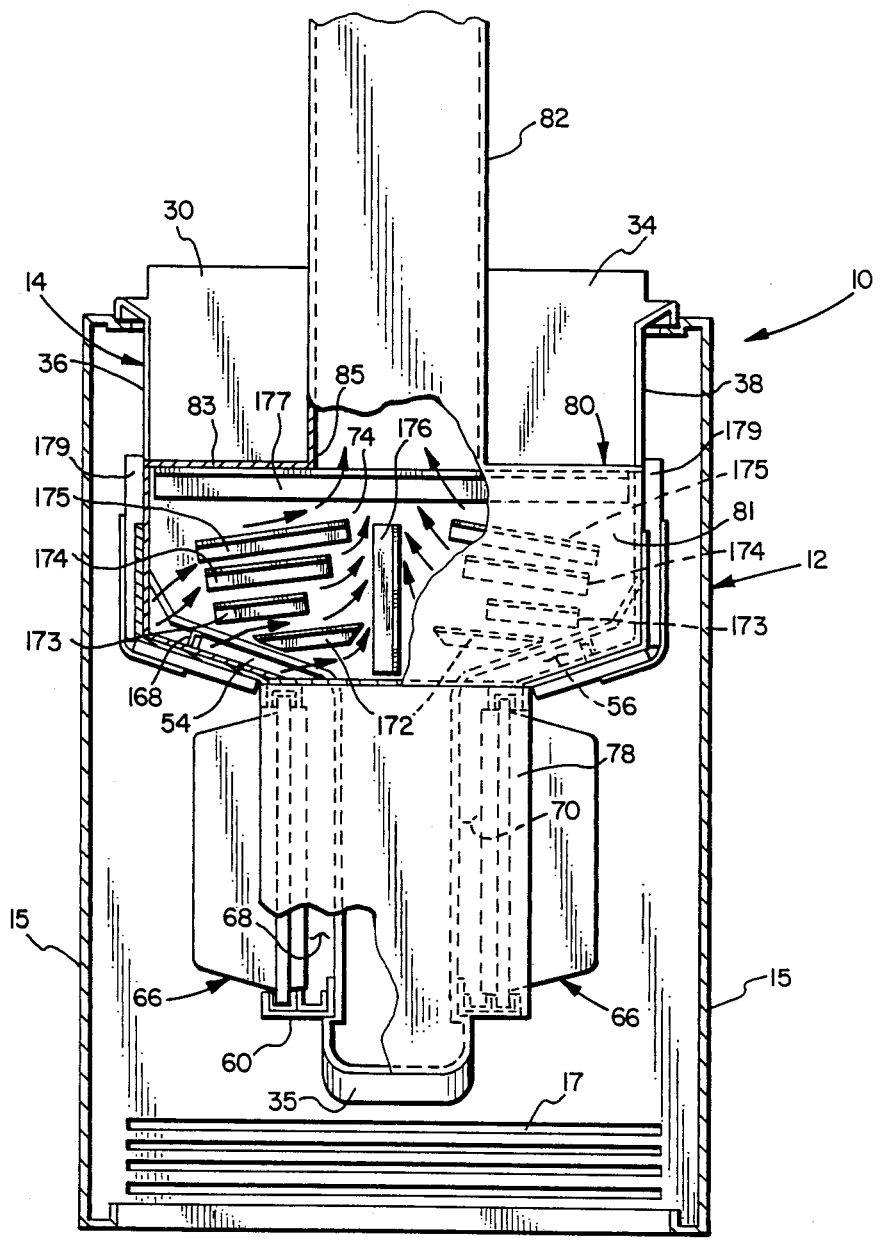
FIG. 9 is a rear elevation, partially broken away, of the frypot assembly.

Referring now to FIG. 9, the rear wall 34 of the frypot 30 also includes an arrangement of flow directing and heat transfer vanes or fins comprising a plurality of somewhat L shaped members 172, 173, 174, 175 and 176. The vanes 172 through 175 are provided in opposed sets arranged opposite each other and inclined toward the vertical centerline of the frypot assembly 14. The vane 176 is oriented vertically and generally along the centerline to deflect the flow of combustion gases coursing through the channels between the vanes 172 through 175, generally upwardly. An elongated transverse vane or baffle 177 is also disposed across the upper edge of the chamber 74 defined by the plenum 80 and the rear wall 34 and provides an additional heat transfer surface. The configuration of the vanes 172 through 177 is substantially the same as the vanes 166 through 168 and these vanes are also secured to the rear wall 34 by suitably spaced apart spot welds. Accordingly, as the combustion gases flow from the combustion chambers 68 and 70, a substantial amount of heat exchange is obtained as the gases flow through the passages 54 and 56 and into and through the chamber 74, thanks to the configuration of the flow directing and heat transfer fins or vanes described herein.

The thermal efficiency of the frypot assembly 14 is also enhanced by the provision of the insulated front and backwall panels 76 and 78 and insulation panels 179, FIG. 4, which are applied to the outer surfaces of the sidewall portions 46, 50 and 48, 52 and extend upward along parts of the sidewalls 43 and 45. Furthermore, the configuration of the burner assemblies 66 provides for maintaining a layer of combustion air between the combustion chambers 68 and 70 and the outer walls 133 of the housings 132 to further reduce heat loss from the frypot assembly 14. The combustion chambers 68 and 70 and the respective heat exchange passages located downstream of the combustion chambers, together with the flow directing and heat transfer vane arrangement disposed therein, provides for a more even distribution and transfer of heat from the combustion gases to the cooking oil within the interior chamber 40 than with prior art cooking apparatus of the general type described herein.

Figure 12:
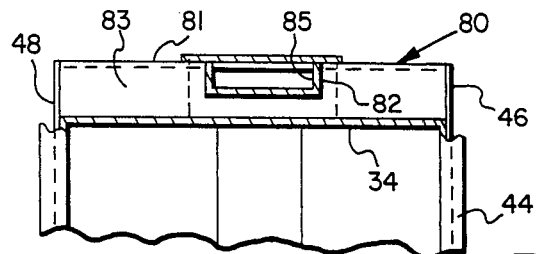
FIG. 12 is a front elevation view of a frying apparatus with the frypot of FIG. 11.
Figure 12:
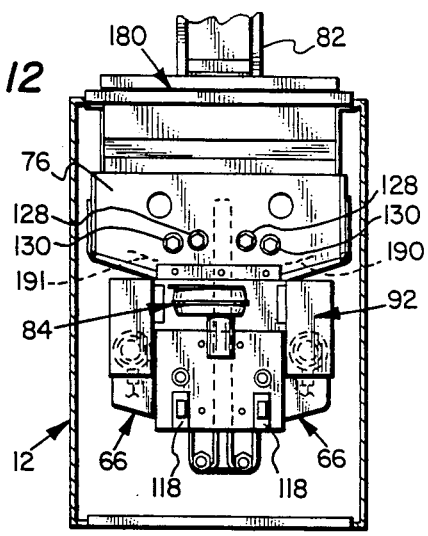
Figure 11:
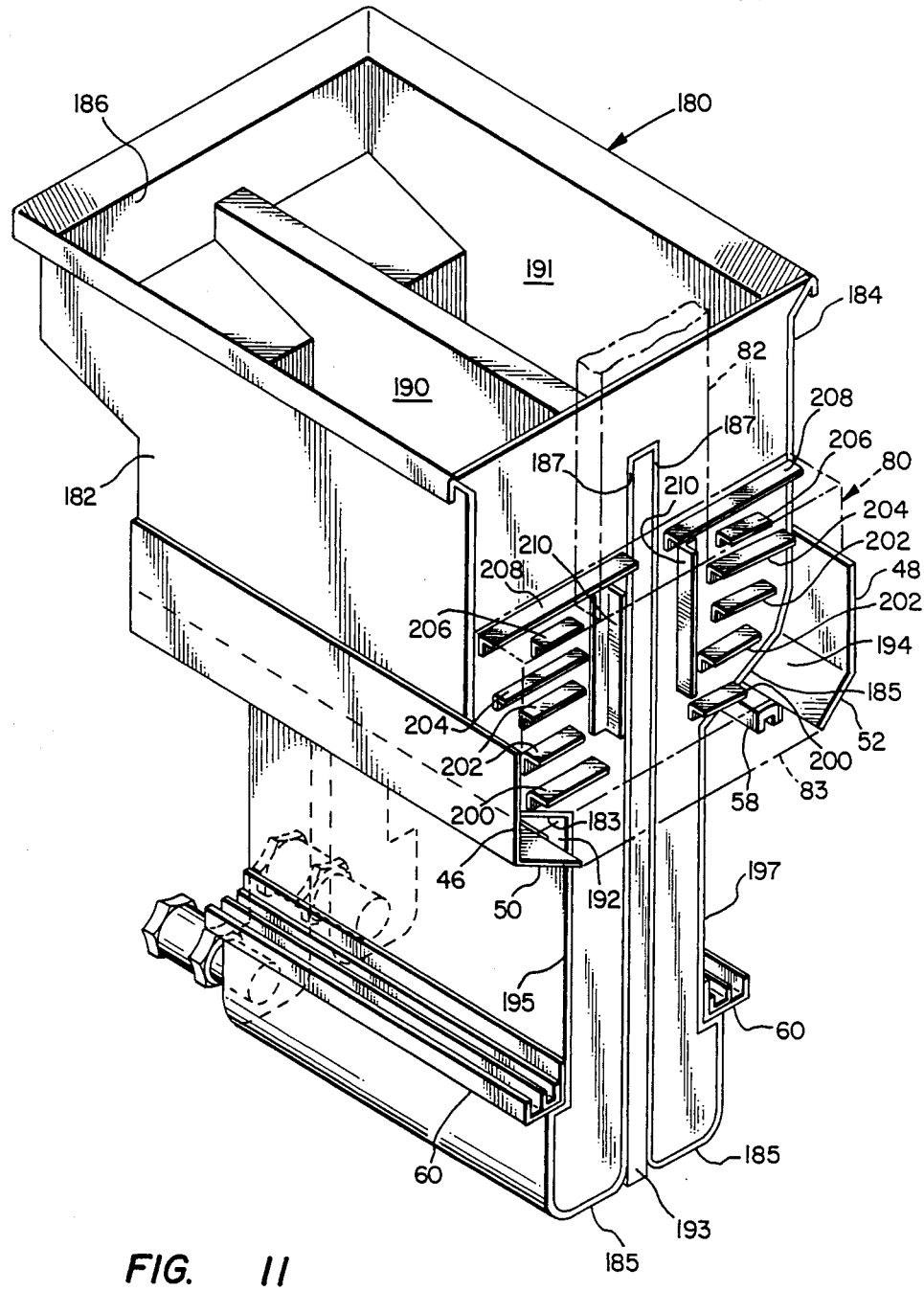
FIG. 11 is a perspective view of a dual cooking chamber frypot.

Referring now to FIGS. 11 and 12 an alternate embodiment of a frypot is illustrated and generally designated by the numeral 180. The frypot 180 is of substantially the same general shape and configuration as the frypot 30 but is shown in FIG. 11 without the respective front, back and side insulation panels 76, 78 and 179 in place and without the opposed burner assemblies 66 or the charging air system. The frypot 180 may be interchanged with the frypot 30 in the apparatus 10. The frypot 180 includes sidewalls 182 and 184, opposed front and rear walls 186 and 188 which are suitably welded along their contiguous edges to form a unitary container. The frypot 180 is also provided with an inverted U shaped partition forming spaced apart intermediate vertical sidewalls 187 which divide the frypot into opposed smooth walled interior cooking oil chambers 190 and 191. The partition forming the sidewalls 187 is suitably welded to the front and rear endwalls and bottom walls of the frypot 180. An insulated partition panel 193 is adapted to be inserted in the slot formed between the intermediate side walls 187 and 188 to reduce heat transfer between the chambers 190 and 191 so that the respective chambers may be maintained at different cooking temperatures, if desired. In this regard, the frypot assembly 180 is provided with two sets of temperature probes 128 and 130, FIG. 12, one set for each of the respective cooking chambers 190 and 191. The respective temperature sensors or probes 128 and 130 in both the frypots 30 and 180 are utilized in a control circuit for controlling the flow of fuel to the respective fuel nozzles 112. In the frypot 180, in particular, the burners 66 are desirably controlled substantially independently of each other.

The frypot 180 is also adapted to be provided with the exhaust plenum 80 which may be modified to have a vertically extending centrally disposed flow dividing plate, not shown, to separate the flow streams of combustion gases exiting from respective flow heat exchange passages along each side of the frypot. The frypot 180 is also provided with respective heat exchange flow passages 192 and 194 formed between opposed outer sidewall members 46, 50 and 48, 52 and respective intermediate sloping sidewall portions 183 and 185. The sidewalls 182 and 184 also include vertically extending lower sidewall portions which together with the burner assemblies 66, FIG. 12, form the opposed combustion chambers 68 and 70 communicating with the passages 192 and 194, respectively. The passages 192 and 194 are provided with an array of flow directing and heat transfer vanes secured to the respective side walls portions 183 and 185 in substantially the same arrangement as previously described for the frypot 30.

However, as shown in FIG. 11, the frypot rear wall 188 is modified to include a somewhat different pattern of flow directing and heat exchange vanes. The rear wall 188 includes a series of L shaped combination heat transfer fins and flow directing vanes 200, 202, 204, 206, 208 and 210. The fin or vanes 200, 202, 204, 206, 208 and 210 are also suitably welded to the rear wall 188 to maximize heat transfer from the combustion gases through the rear wall to the respective cooking chambers. The arrangement of the fins or vanes 200, 202, 204 and 206 provides for directing the flow of combustion gases across a major portion of the respective opposed sides of the rear wall on each side of the partition 193 and the vanes 210 serve as baffles to redirect the gas flow upward toward the stack 182.

From the foregoing description it will be appreciated that the configuration of the frypots 30 and 180 provide for a heat transfer capacity and overall thermal efficiency for a fryer type cooking apparatus superior to that known in the art heretofore. The substantially sealed combustion chambers and heat exchange passages as described provided for supercharging the chamber and flow passages with a forced flow of combustion air to assure that complete combustion of the fuel is obtained. Moreover, a greater flow rate of fuel may be injected into the system to minimize warmup time and to maintain a proper cooking temperature when large cooking loads are introduced into the cooking oil. With the arrangement of the blower 84 and the distribution and charging air manifold assembly 92, whereby a balanced and proportioned flow of charging air may be introduced into each of the respective burner assemblies 66, the cooking oil may be more uniformly heated in a single frypot such as the frypot 30, and particularly, the dual chamber frypot 180 having the respective separate cooking chambers 190 and 191. Moreover, the relatively complex flow path for the combustion gases between the combustion chambers and the stack 82 maximizes the heat transfer from the combustion gases to the cooking oil to further enhance the overall thermal efficiency of the system.

The frypot assembly 14 using either the frypots 30 or 180 is also relatively easily serviced for repair or replacement of various components including the burner assemblies 66. For example, by removal of the manifold assembly 92 together with the front wall panel 76, the burner assemblies may be slid out of the grooves in their opposed support channels and then subsequently disassembled for cleaning, repair or replacement of component parts.

The construction of the frypots 30 and 180 and the associated structures are adapted to the use of conventional engineering material such as stainless or alloy steel sheet. Suitable insulation materials such as fiberglass mat or ceramic materials enclosed within a suitable shell structure may be used for the panels 179 and the end wall panels 76 and 78.

The operation of the cooking apparatus 10 with either the frypot 30 or the frypot 180 is believed to be readily apparent from the foregoing description. However, briefly, the operation of the blower 84, the igniters 118 and the control valves 117 for the respective fuel injection nozzles 112 are selectively controlled by a suitable control circuit associated with the control panel 18 and including a master on/off switch, not shown, and to the temperature sensors 128 and 130. The controls for a single frypot arrangement using a frypot 30 would normally use only one set of sensors 128 and 130. The particular arrangement of the burner assemblies 66 provides for precise control of the heat input to the opposite sides of the frypot assembly due to the arrangement of the separate air flow control valves 104 and 105 for controlling the flow of charging air to the respective combustion chambers 68 and 70 and also the separately controllable fuel injection nozzles 112 for the respective burner assemblies. Any imbalance in the heating of the cooking oil within the interior chambers of the frypots 30 or 180 can, of course, be corrected by proportioning the flow of charging air conducted through the respective manifold ducts 96 and 98 by selectively positioning the valve gate members 104 and 105, respectively. The control valves 117 can also be independently controlled to regulate fuel flow to the respective burner tubes 100 and 102.

Although preferred embodiments of the present invention have been described in detail herein, those skilled in the art will recognize that various substitutions and modifications may be made to the specific structure shown and described without departing from the scope and spirit of the present invention as recited in the appended claims.

What is claimed is:

1. A fryer apparatus comprising:
 (a) a container having opposed outer sidewalls, opposed endwalls and a bottom for holding cooking oil for cooking food; said opposing sidewalls having integral first, second, and third portions, the first portions extending vertically upwards from the second portions, the second portions sloping inwardly and downwardly to the third portions, and the third portions extending vertically downwardly to the bottom wall whereby, the third portions and bottom wall form a narrow well for the container;

(b) a heat exchanger means, said means operatively connected to the second portions of the container's opposing sidewalls for forming ducts therewith, said ducts having first ends closed by the front endwalls and second ends forming outlets through the rear endwall, and first sides coacting with the third portions of the opposing sidewalls to form closed duct tops and second sides forming open bottoms for receiving combustion gases; and combustion gases directing, turbulating, and heat transfer means operatively mounted within the ducts for dividing incoming combustion gases, turbulating the combustion gases for even distribution across the duct and directing the gases to the front and rear endwalls, respectively, and returning the combustion gases from the front endwall to the rear endwall for discharge with the combustion gases directed toward the rear endwall;

(c) burner means including combustion chambers operatively connected to the third well forming portions of the opposing sidewalls above a bottom well portion and to the open duct bottoms, and a combustion charging means for charging said combustion chambers with air and fuel at superatmospheric pressure to maximize heat generated in said combustion chambers and to force the flow of combustion gases through said combustion chambers and said heat exchanger means whereby a well cold zone is formed below the combustion chambers and a cooking zone is formed above the cold zone having improved oil circulation.

2. A fryer apparatus for cooking food comprising:

(a) a frypot including container forming front and rear endwalls, opposing sidewalls, and a bottom wall, said opposing sidewalls shaped to form first, second, and third integral portions, the first portions extending vertically upwards from the second portions for forming a main cooking chamber, the second portions sloping inwardly and downwardly to the third portions, and the third portions extending vertically downwardly to the bottom wall whereby, the third portions and bottom wall coact to form a narrow well for the frypot;

(b) a heat exchanger means, said heat exchanger means including a duct having a sidewall body portion exteriorly spaced from the second portion of a first one of the frypot opposing sidewalls, said sidewall body portion having first and second ends and first and second sides, said first end engaging the frypot front endwall and the second end forming a duct outlet for the rear endwall and the first side in closing engagement with a first portion of the first one of the frypot opposing sidewalls, and the second side forming an inlet for combustion gases entry into the duct; and combustion gases directing, turbulating, and heat transfer means operatively mounted within the duct for dividing incoming combustion gases, directing the combustion gases toward the front and rear endwalls and returning the combustion gases from the front end to the rear end for discharge with the combustion gases directed toward the rear endwall; and (c) a forced flow gas burner means having a fuel distribution plate, a combustion surface, and a combustion chamber, said distribution plate and combustion surface forming opposed interior flow channels for even distribution of the fuel-air mixture through the combustion surfaces into the combustion chamber, said combustion chamber operatively connected to a portion of the frypot well above a bottom portion thereof and to the open end of the duct means, whereby responsive to the heat transfer of the burner means and heat exchanger means to the container's oil, a cold zone remains in the well's bottom portion for minimizing cooking debris circulation and a thermal gradient is formed in the oil above the cold zone for improved oil circulation for heating in the main cooking chamber.

3. A fryer apparatus according to claim 2 wherein said forced flow gas burner means includes a housing forming fuel-air mixing and distribution chamber means, said burner assembly defining in part said combustion chamber.

4. A fryer apparatus according to claim 3 wherein:
said housing of said burner assembly is disposed along the third portion of the first one of said opposing sidewalls, and said combustion chamber is formed between said third portion and said housing wherein said housing forms a heat insulation barrier to minimize heat loss from said combustion chamber.

5. A fryer apparatus according to claim 2 wherein:
said combustion gases directing, turbulating and heat transfer means includes a plurality of vanes operatively arranged for directing and turbulating the gases through said heat exchanger means, said vanes including portions contiguous with said second portion of the first one of said opposing sidewalls for conducting heat from said combustion gases to said cooking oil through said second portion.

6. A fryer apparatus according to claim 5 wherein:
said vanes are formed by heat conductive plate members bent at an angle to form a vane portion and a base portion for securing said vanes to said second portion of the first one of said sidewalls.

7. A fryer apparatus according to claim 2 wherein said rear endwall includes a flow passage having a plurality of flow directing vanes secured on said rear endwall for causing the flow of combustion gases across said endwall to change direction, said vanes secured to said endwall including portions contiguous with said endwall for conducting heat from said combustion gases to said cooking oil through said endwall.

8. A fryer apparatus according to claim 7 wherein:
said flow passage includes an exhaust plenum operatively connected to the rear endwall.

9. A fryer apparatus according to claim 2 wherein:
said forced flow burner means includes a damper operable to prevent the flow of air through said combustion chamber absent any forced air pressure.

10. A fryer apparatus according to claim 2 wherein:
said burner means includes a burner assembly supported on said apparatus adjacent to the third portion of the first opposing sidewall;
said burner assembly including a housing having an inlet conduit for receiving a fuel-air mixture, foraminous burner plate means mounted on said housing and facing said combustion chamber, and flow distributing means interposed in said housing between said burner plate means and an inlet flow chamber in said housing.

11. The fryer apparatus set forth in claim 10 wherein:

said flow distributing means comprises a distribution plate having opposed sidewalls containing a plurality of distribution ports, respectively, and said distributor plate includes a sloping front wall defining opposed flow chambers of progressively decreasing flow area toward a central axis of said burner plate means for maintaining a substantially even distribution of flow of fuel-air mixture through said burner plate means.

12. In a freestanding commercial type frying unit for using at least from about twenty five to about fifty pounds of cooking oil and having a back end adapted to be placed against a building wall and a front end adapted to face a work space, the front and back ends defining a horizontal depth, and opposite sides adapted to be placed against other similar commercial cooking equipment, the opposite sides defining a width somewhat less than the horizontal depth, the high efficiency improvement comprising:

means forming a frypot for holding the quantity of cooking oil, the frypot having:
 a substantially open top having dimensions corresponding generally to the width of the unit and a substantial portion of the horizontal depth of the unit,
 a cool zone formed in a lower portion of the frypot which is substantially narrower than the width of the unit, and
 at least one heat transfer surface extending substantially from a front wall at the front end to a back wall at the back end of the frypot and providing a generally vertical transition from the cool zone upwardly toward the open top of the frypot, each heat transfer surface including a primary heat transfer area and a secondary heat transfer area,
 the primary heat transfer area extending substantially from the front end to the back end of the frypot and from the cool zone upwardly over only a portion of the heat transfer surface, and the secondary heat transfer area being above the primary heat transfer area and including substantially the remainder of the respective heat transfer surface;

elongated fuel-fired radiant burner means disposed adjacent to and extending for substantially the front-to-back length of the primary heat transfer area for combusting a fuel-air mixture supplied under pressure and transversely directing the hot gases of combustion and radiant energy from the burner means along and over substantially all of the primary heat transfer area;

combustion gas flow control means for collecting the gases of combustion from the burner means and directing the collected gases of combustion over the secondary heat transfer area to a vertical flue extending upwardly along the back end wall of the unit, the combustion gas flow control means directing at least a significant portion of the gases from the burner means first forwardly from a point of collection of the gases substantially to the front end of the heat transfer surface and then rearwardly to the back end of the heat transfer surface, along said secondary heat transfer area, and thence to said vertical flue; and fuel/air mixture delivery means disposed generally at the front of the means forming the frypot and including a blower for delivering a combustible fuel-air mixture to the burner means at an elevated pressure sufficient to force the fuel/air mixture and gases of combustion through the burner means and combustion gas flow control means to the flue in a manner such that said primary heat transfer area is significantly radiantly heated along its length, and a large portion of the heat in the collected gases of combustion is efficiently transferred to said second heat transfer area prior to the discharge into said flue of the collected gases of combustion.

13. The improvement of claim 12 wherein there are two heat transfer surfaces, one extending upwardly and outwardly from each side of the cool zone.

14. The improvement of claim 13 wherein each secondary heat transfer area includes a portion of said back wall of the frypot and the combustion gas flow control means include means for directing the combustion gases in heat exchange relationship with said back wall of the frypot before being delivered to the vertical flue.

15. The improvement of claim 12 wherein each primary heat transfer area is generally vertically disposed and each secondary heat transfer area is generally horizontally disposed.

16. The improvement of claim 15 wherein the burner means include a thermally radiant mass corresponding generally in area to the primary heat transfer area and which is heated by the combustion of the fuel-air mixture and then radiates the heat to the primary heat transfer area.

17. The improvement of claim 12 wherein the combustion gas flow control means include a plurality of fin means disposed generally normal to and in effective heat exchange relationship with the means forming the frypot to enhance heat transfer to the means forming the frypot.

* * * * *